US009507471B2

(12) United States Patent
Liu et al.

(10) Patent No.: US 9,507,471 B2
(45) Date of Patent: *Nov. 29, 2016

(54) ARRAY SUBSTRATE, COLOR FILTER SUBSTRATE, TOUCH CONTROL DISPLAY DEVICE AND METHOD FOR DRIVING THE SAME

(71) Applicants: SHANGHAI TIANMA MICRO-ELECTRONICS CO., LTD, Shanghai (CN); TIANMA MICRO-ELECTRONICS CO., LTD., Shenzhen (CN)

(72) Inventors: Baoling Liu, Shanghai (CN); Lingxiao Du, Shanghai (CN); Qijun Yao, Shanghai (CN); Jun Ma, Shanghai (CN)

(73) Assignees: SHANGHAI TIANMA MICRO-ELECTRONICS CO., LTD, Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 81 days.

This patent is subject to a terminal disclaimer.

(21) Appl. No.: 14/281,897

(22) Filed: May 20, 2014

(65) Prior Publication Data

US 2015/0185902 A1 Jul. 2, 2015

(30) Foreign Application Priority Data

Dec. 31, 2013 (CN) .......................... 2013 1 0754202

(51) Int. Cl.
*G06F 3/047* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC ...... G06F 3/044; G06F 3/045; G06F 3/0412; G06F 3/0416; G06F 3/0488; G06F 3/047; G06F 2203/04111
See application file for complete search history.

(56) References Cited

U.S. PATENT DOCUMENTS

2009/0096759 A1* 4/2009 Nishiwaki ............... G06F 3/041
345/173
2013/0044074 A1* 2/2013 Park .................... G02F 1/13338
345/174

(Continued)

FOREIGN PATENT DOCUMENTS

CN 102945106 A 2/2013
CN 103472613 A 12/2013

OTHER PUBLICATIONS

Office Action for CN 201310754202.0 dated Jul. 1, 2016, 5 pages.

*Primary Examiner* — Ricardo L Osorio
(74) *Attorney, Agent, or Firm* — Kilpatrick Townsend & Stockton LLP

(57) ABSTRACT

The disclosure provides an array substrate and a color filter substrate of a capacitive touch control screen, a touch control display device and a method for driving the touch control display device, so as to achieve the self-capacitive multi-point touch. The array substrate of the capacitive touch control screen includes: a peripheral area and a display area; a plurality of pixel units with pixel electrodes arranged in the display area; a plurality of touch control electrodes; and touch control electrode lead wires connected with a module configured to detect a touch control signal, wherein each of the touch control electrodes is connected respectively with one of the touch control electrode lead wires.

13 Claims, 12 Drawing Sheets

(56) References Cited

U.S. PATENT DOCUMENTS

| | | | |
|---|---|---|---|
| 2014/0055702 A1* | 2/2014 | Park | G02F 1/136286 349/43 |
| 2014/0362029 A1* | 12/2014 | Mo | G06F 3/0412 345/174 |
| 2015/0084912 A1* | 3/2015 | Seo | G06F 3/044 345/174 |
| 2015/0109543 A1* | 4/2015 | Lee | G06F 3/044 349/12 |
| 2015/0185903 A1* | 7/2015 | Park | G06F 3/044 345/173 |

* cited by examiner

US 9,507,471 B2

ARRAY SUBSTRATE, COLOR FILTER SUBSTRATE, TOUCH CONTROL DISPLAY DEVICE AND METHOD FOR DRIVING THE SAME

CROSS-REFERENCES TO RELATED APPLICATIONS

This application claims priority to Chinese Patent Application No. 201310754202.0, entitled "array substrate, color filter substrate, touch control display device and methodS for driving the same", filed with the State Intellectual Property Office of People's Republic of China on Dec. 31, 2013, the content of which is incorporated herein by reference in its entirety for all purposes.

BACKGROUND OF THE INVENTION

In the prior art, capacitive touch control technologies can fall into self-capacitive and mutual-capacitive technologies as per capacitance detection schemes and into in-cell, on-cell and out-cell technologies as per the relative relationship between a Thin Film Transistor (TFT) and a Color Filter (CF) substrate, where the in-cell technology has become a significant development direction of the touch control technologies due to its high integration, thinness, superior performances and other advantages. Various conventional systems and methods exist, but unfortunately inadequate. New and improved systems and methods of capacitive touch control are desired.

DETAILED DESCRIPTION OF THE INVENTION

Embodiments of the invention provide an array substrate and a color filter substrate of a capacitive touch control screen, a touch control display device and a method for driving the touch control display device, so as to achieve the self-capacitive multi-point touch. There are other embodiments well.

Figure 1:
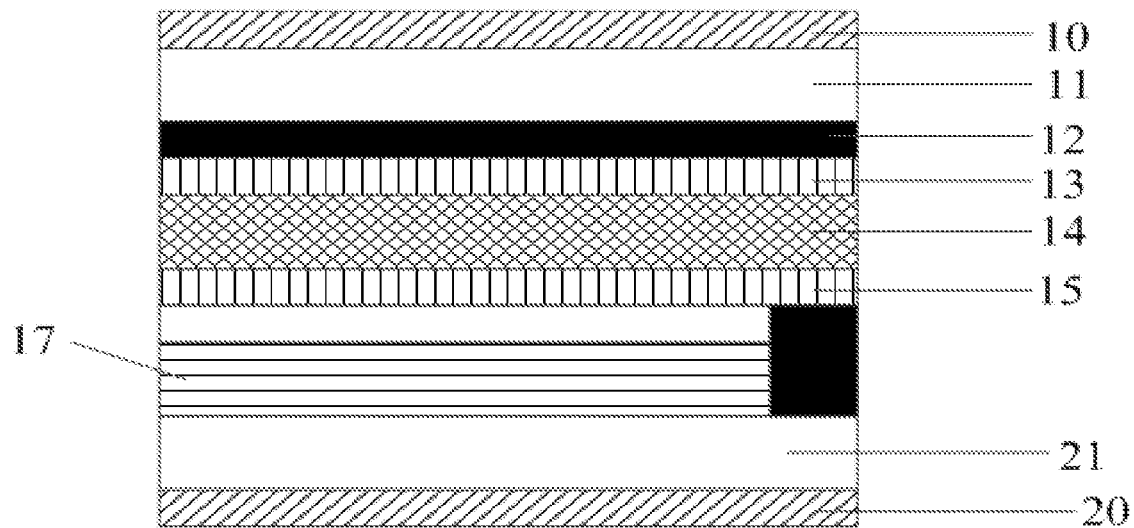
FIG. 1 is a schematic structural diagram of a mutual-capacitive design on the color filter substrate side in the prior art.

As mentioned above, conventional systems and methods exist, but are inadequate. Certain conventional systems and inadequacies thereof are described in more detail below. The CF side in-cell mutual-capacitive technology in the prior art is illustrated in FIG. 1, where a CF substrate and an array substrate are arranged in opposite. The array substrate includes a glass substrate 21, a thin film transistor element layer 17 arranged on the glass substrate 21, and a polarization sheet 20 on the outside of the glass substrate 21. The CF substrate includes a glass substrate 11, a Black Matrix (BM) 12 arranged on the glass substrate 11, and a first metal layer 13 and a second metal layer 15 below the BM, where there is a color filter layer 14 between the first metal layer 13 and the second metal layer 15, and the first metal layer 13 and second metal layer 15 added on the CF substrate side function as mutual-capacitive touch control traveling lines. In order to lower interference to display signals, touch control and display operations need to be performed separately, and it is necessary to spare a sufficiently long period of time to perform the touch control operation for a display Integrated Circuit (IC). A period of time required for a touch control operation in the general mutual-capacitive scheme is proportional to the number of scanned channels so that the larger a screen is, the larger the number of channels will be, the longer the period of time required for the touch control operation will be, and the shorter a period of time spared for a display scan operation will be, but the period of time for the display scan operation can only be shorten finitely, and consequently the screen size which can be supported in the existing mutual-capacitive scheme is limited greatly.

Figure 2:
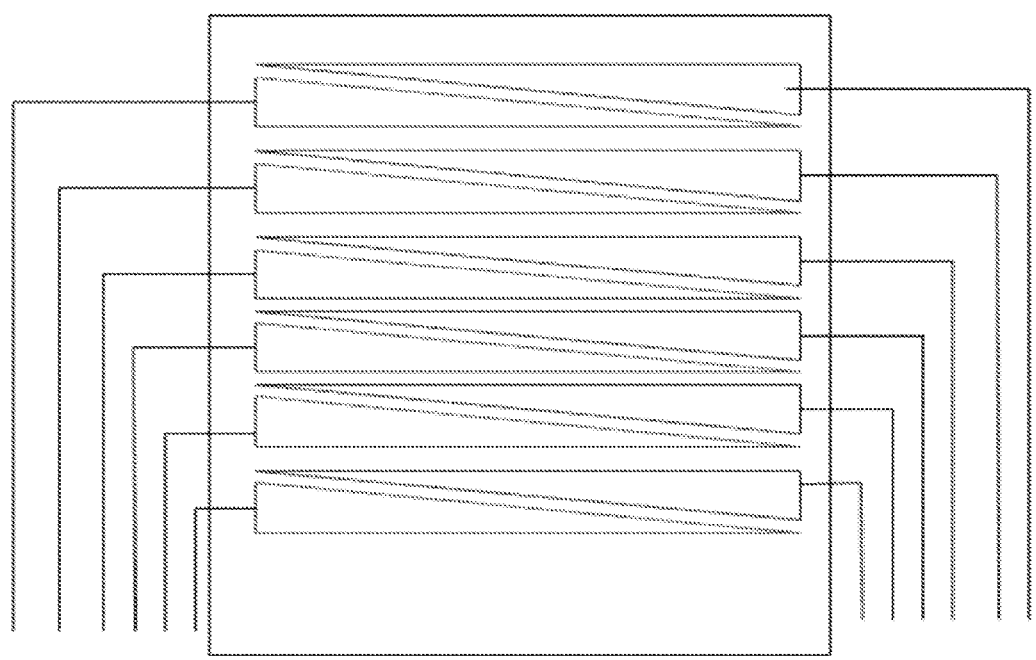
FIG. 2 is a schematic diagram of an out-cell self-capacitive design in the prior art.
Figure 3:
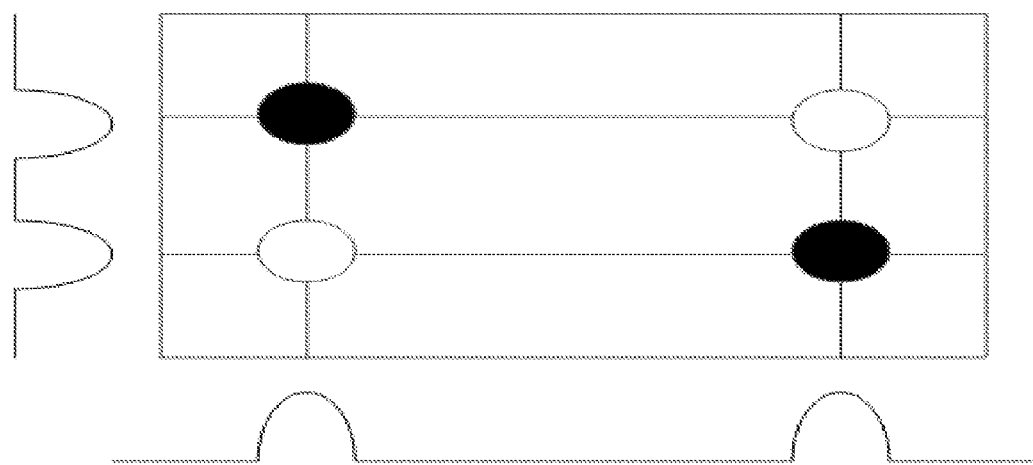
FIG. 3 is a schematic diagram of ghost points appearing as a result of a self-capacitive two-point touch in the prior art.

General self-capacitive designs in the prior art are mostly used for out-cell structures, and as illustrated in FIG. 2, there is a triangular pattern design embodied by using a structurally simple and highly sensitive single-layer pattern but incapable of a multi-point touch control operation, for example, when there is a two-point touch, only abscissas and ordinates of two points can be given concurrently without differentiating the ordinates corresponding to the respective abscissas, that is, ghost points (i.e., black points shown in FIG. 3) appear when two points are touched concurrently in the self-capacitive design in the prior art, as illustrated in FIG. 3. The multi-point touch can not be identified directly in the self-capacitive design in the prior art, and algorithms have to be used to approach the effect of the multi-point touch. When the self-capacitive design is directly applied to the in-cell scheme, an overly large area of a capacitor results in an overly high parasitic capacitance, to thereby form a background value of an inductive capacitance, which is difficult to be achieved.

In summary, the multi-point touch can not be achieved in the self-capacitive design in the prior art.

Embodiments of the invention are described below in detail.

Figure 4:
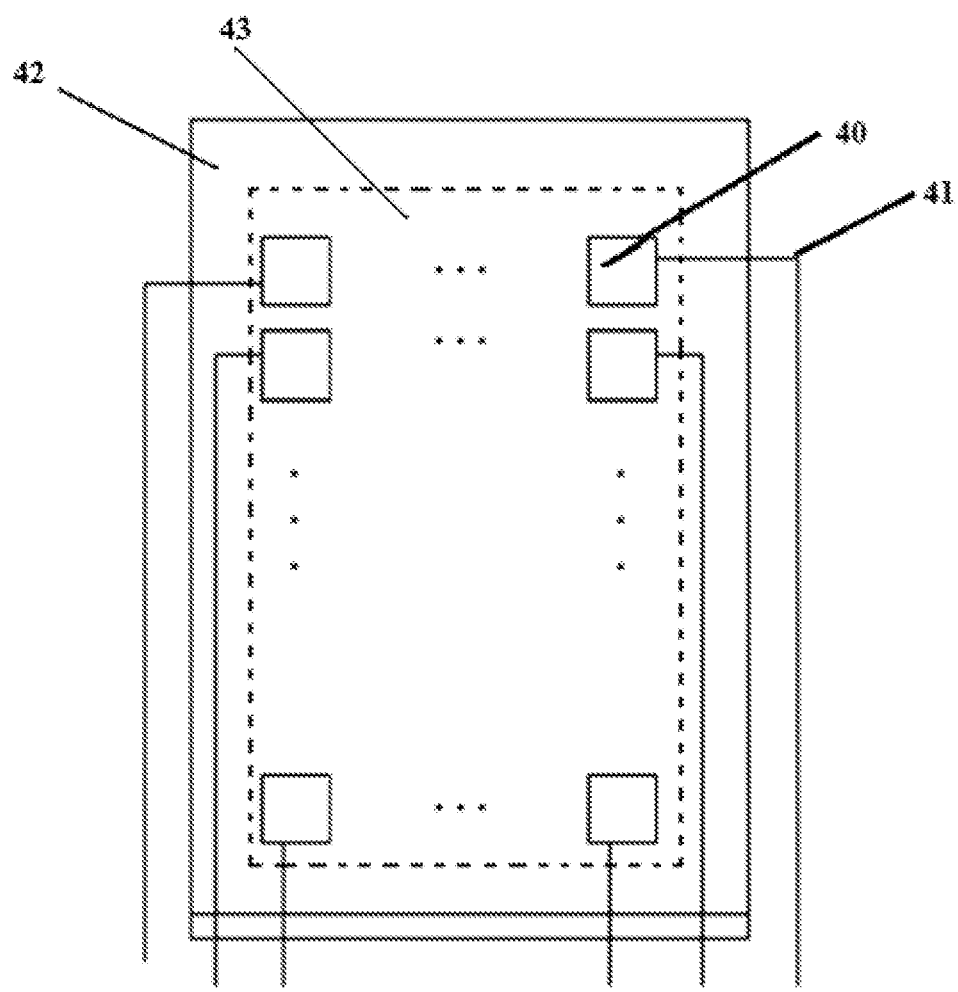
FIG. 4 is a schematic structural diagram of touch control electrodes and touch control electrode lead wires in an array substrate of a capacitive touch control screen according to an embodiment of the invention.

As illustrated in FIG. 4, which is a schematic structural diagram of touch control electrodes and touch control electrode lead wires in an array substrate of a capacitive touch control screen according to an embodiment of the invention, the array substrate includes a peripheral area 42 and a display area 43. A plurality of pixel units with pixel electrodes are positioned within the display area 43. The array substrate also a plurality of touch control electrodes 40 and touch control electrode lead wires 41 connected with a module configured to detect a touch control signal, where each touch control electrode 40 correspond to one or more of pixel units. Each touch control electrode 40 is connected respectively with one touch control electrode lead wire 41. The array substrate further includes a common electrode arranged above the pixel electrodes, where the common electrode acts as the touch control electrodes 40. In a particular embodiment of the invention, the common electrode comprises a transparent conductive layer, which is preferably made of the Indium Tin Oxide (ITO) material.

Figure 5:
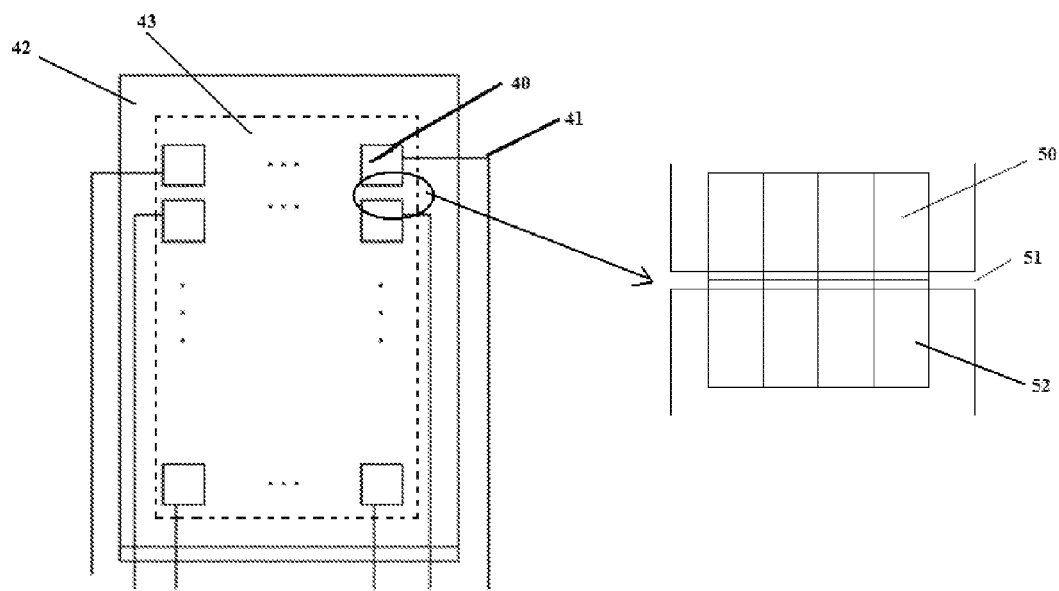
FIG. 5 is an enlarged schematic diagram between two adjacent touch control electrodes in an array substrate of a capacitive touch control screen according to an embodiment of the invention.

Specifically for a liquid crystal display in the Fringe Field Switching (FFS) mode, a gate layer, a semiconductor active layer, a source layer, a drain layer, an insulation passivation layer, pixel electrodes and a common electrode are fabricated in that order on a substrate, where the respective layers of the FFS liquid crystal display can be fabricated in the existing processes, so the repeated description thereof will be omitted here. In this embodiment, the common electrode is positioned above the pixel electrodes and made of the transparent ITO material, and in a particular embodiment of the invention, the pixel electrodes may comprise of the transparent ITO material. As illustrated in FIG. 5, the common electrode is separated out in the display area 43 and divided into separate zones, each of which is one touch control electrode 40 configured to detect a signal separately. All the touch control electrodes 40 are led out through a plurality of touch control electrode lead wires 41 and finally connected onto an Integrated Circuit (IC) or a Flexible Printed Circuit (FPC) for detection. The common electrode layer fabricated in this process is at the top. Since the common electrode further provides a common voltage to each pixel unit, the common electrode is broken between adjacent pixel units 50 and 52 in the display area 43, such as a gap 51 as illustrated, to thereby avoid influencing the normal picture display due to reusing of the common electrode as the touch control electrodes.

For an FFS design in another film layer architecture, a common electrode can be similarly selected as touch control electrodes, for example, in order to improve the optical performance, an organic film layer can be added on the TFT side, and in a typical process sequence, a gate layer, a semiconductor active layer, a source layer, a drain layer, a silicon nitride $SiN_X$ insulation layer, an organic film layer, a common electrode layer, a silicon nitride $SiN_X$ insulation layer and a pixel electrode layer are fabricated in that order on a substrate. Similarly, the respective layers of the FFS design can be fabricated using existing processes, so the repeated description thereof will be omitted here. At this time, the common electrode is arranged below pixel electrodes, and the common electrode can be designed as shown in FIG. 5, where the common electrode is segmented into separate patterns for both display and touch control functions concurrently. The arrangement of the common electrode below the pixel electrodes in this embodiment can lower the load capacitance of the common electrode layer and facilitate an improvement in touch control performances as compared with the arrangement of the common electrode above the pixel electrodes in the embodiments of FIG. 4 and FIG. 5. It is to be appreciated that a load capacitance of the common mode electrode layer can lead to improved performance.

Figure 6:
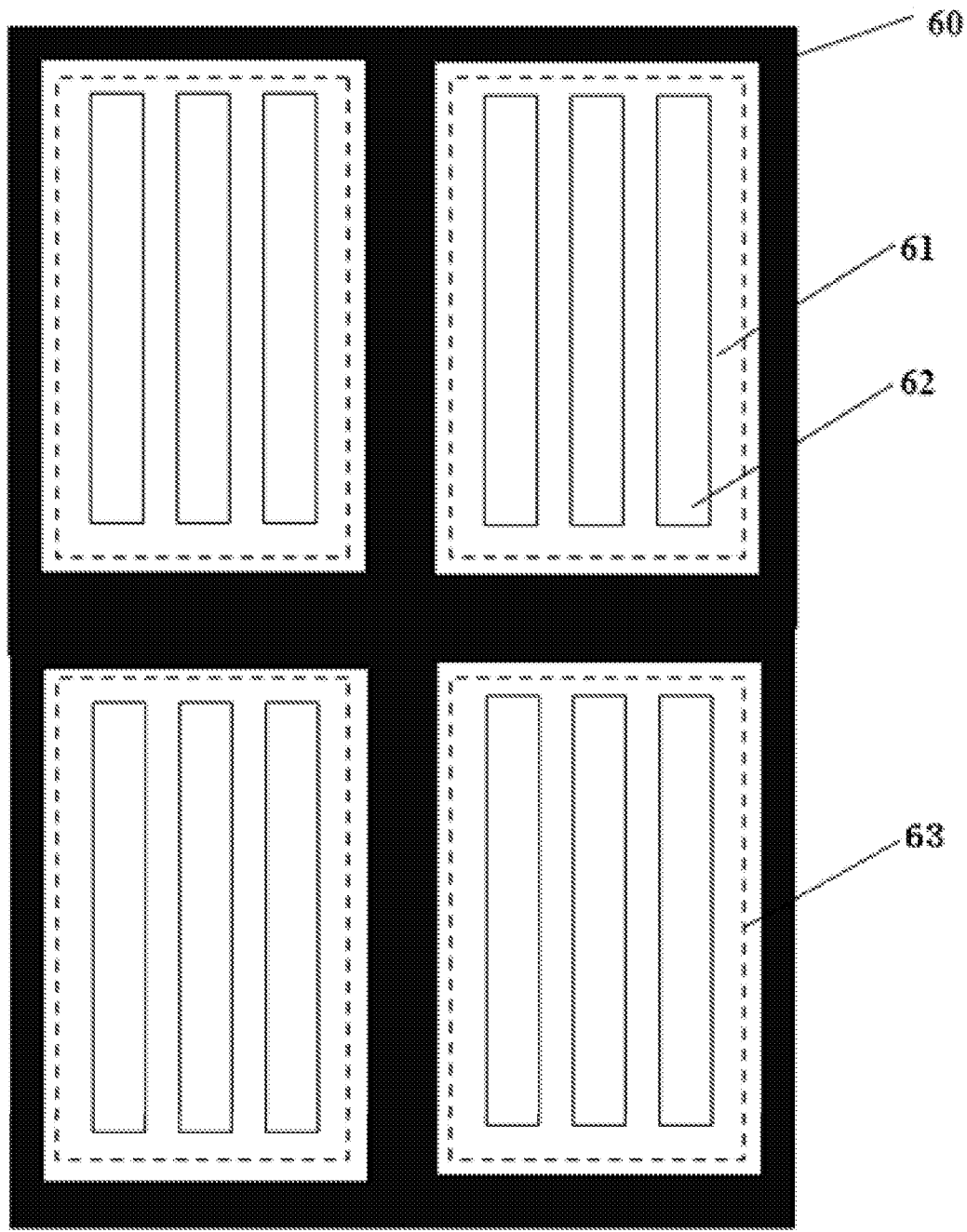
FIG. 6 is a schematic diagram of a common electrode and a metal layer electrically connected with the common electrode in an array substrate of a capacitive touch control screen according to an embodiment of the invention.

According to a particular embodiment of the invention, the array substrate of the capacitive touch control screen further includes a first metal layer 60 electrically connected with a common electrode 61 and arranged in a non-display area between pixel units 63, as illustrated in FIG. 6. Since the common electrode in the particular embodiment of the invention is made of ITO with a higher square resistance, a metal layer can be added on the ITO layer to lower the resistance of the common electrode layer. Since the first metal layer 60 is opaque, the first metal layer 60 only cover the non-display area between the pixel units 63, that is, the first metal layer 60 is arranged in a light shielding area of a black matrix of a color filter substrate, so that even though the first metal layer 60 is opaque, it will not result in reducing the aperture ratio of the display device. As illustrated in FIG. 6, the common electrode 61 includes a plurality of branch electrodes. The common electrode forms a plurality of slits 62 in the pixel unit area, and a horizontal electric field is formed between the branch electrodes of the common electrode 61 and the pixel electrodes and used to control rotations of liquid crystal molecules to thereby achieve the purpose of displaying a picture. In a particular embodiment of the invention, the first metal layer electrically connected with the common electrode comprises low-resistance material, e.g., molybdenum (Mo), aluminum (Al), an alloy thereof and/or another metal material.

Figure 7:
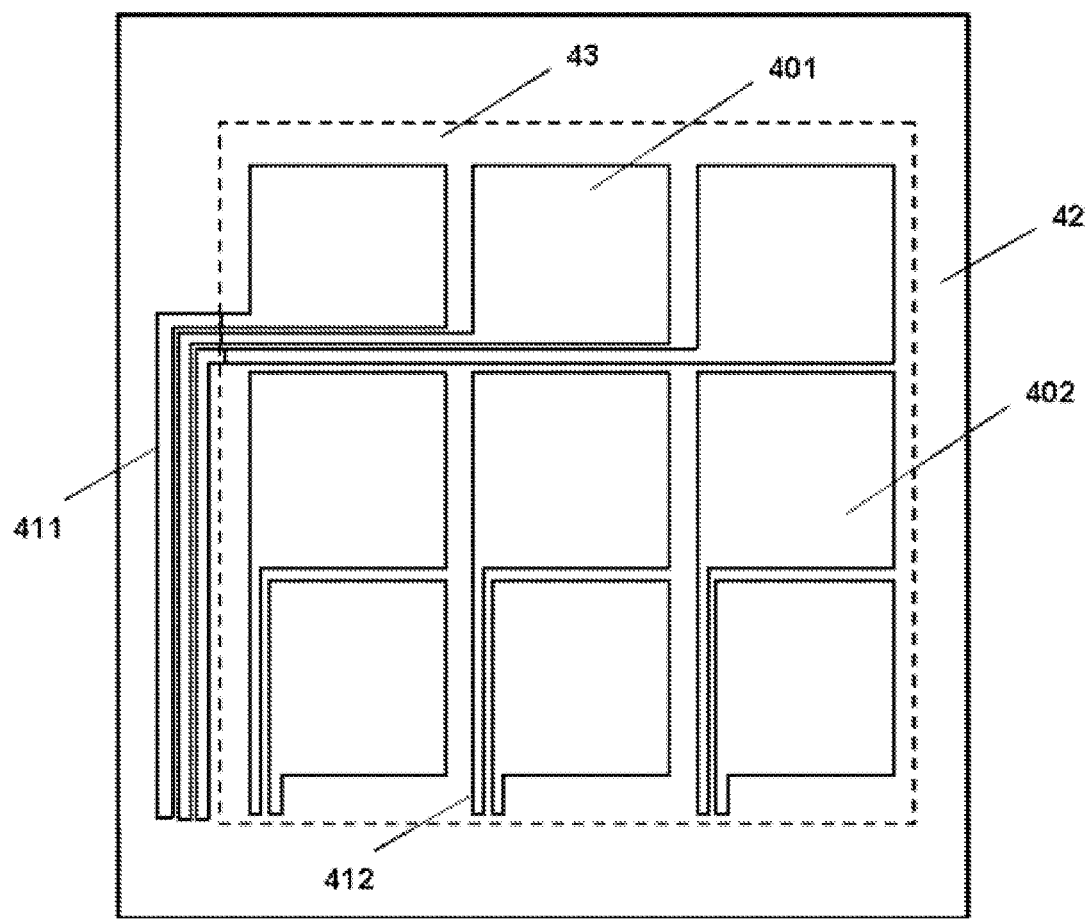
FIG. 7 is a schematic connection diagram of touch control electrode lead wires in an array substrate of a capacitive touch control screen according to an embodiment of the invention.

As illustrated in FIG. 7, according to a particular embodiment of the invention, touch control electrode lead wires 411 of a part of touch control electrodes 401 in the array substrate of the capacitive touch control screen are led out from a single side of the peripheral area 42 of the array substrate to the module configured to detect the touch control signal; and touch control electrode lead wires 412 of a part of touch control electrodes 402 are led out from the display area 43 of the array substrate to the module configured to detect the touch control signal. At this time, the touch control electrode lead wires 41 are the first metal layer or the common electrode layer. Of course, the touch control electrode lead wires can also be led out from two sides of the peripheral area of the array substrate to the module configured to detect the touch control signal. The configuration where the touch control electrodes are led out from two sides of the peripheral area to the module configured to detect the touch control signal can avoid both an overly wide single-side edge of the array substrate and the short-circuiting problem due to overly dense wirings on the single side, as compared to the configuration where the touch control electrode lead wires are led out from the single side of the peripheral area.

The touch control electrode lead wires can alternatively be a gate metal layer or a source metal layer or a drain metal layer, the plurality of touch control electrodes are connected to the touch control electrode lead wires through via holes in an edge area of the display area, and the touch control electrode lead wires are led out from two sides or a single side of the peripheral area of the array substrate to the module configured to detect the touch control signal. All the touch control electrode lead wires can be connected directly to an FPC or an IC outside the display area.

Figure 8:
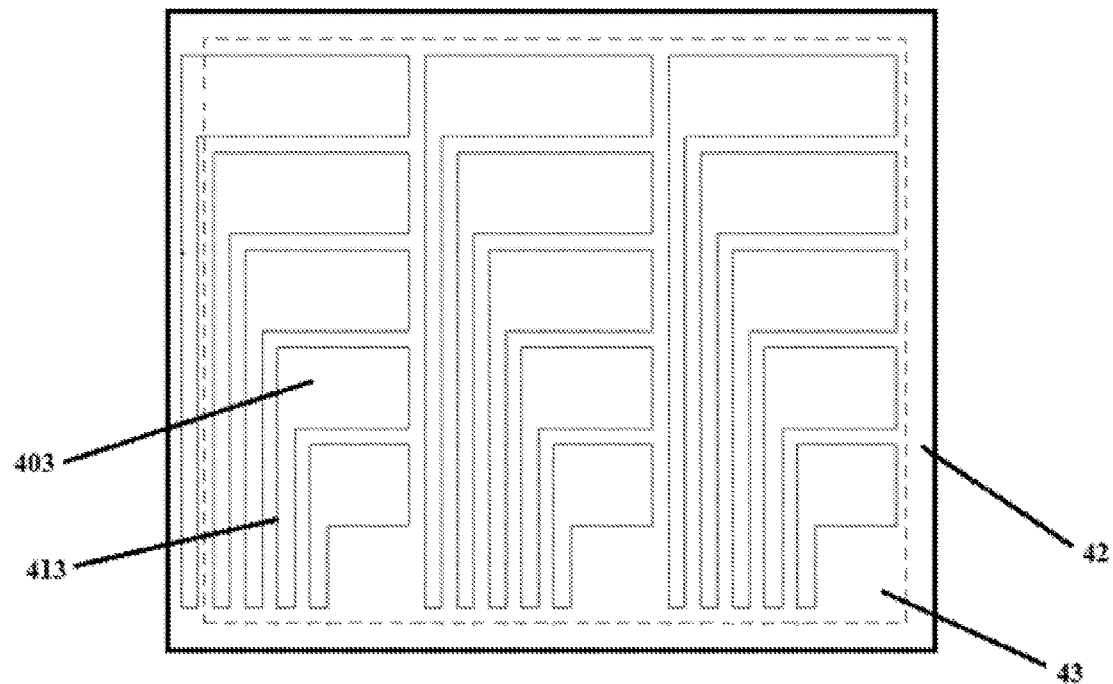
FIG. 8 is another schematic connection diagram of touch control electrode lead wires in an array substrate of a capacitive touch control screen according to an embodiment of the invention.

As illustrated in FIG. 8, touch control electrode lead wires 413 of a part of touch control electrodes 403 in the array substrate of the capacitive touch control screen are led out from the display area 43 of the array substrate to the module configured to detect the touch control signal. At this time, the touch control electrode lead wires 41 are the first metal layer or the common electrode layer. When the first metal layer is used as the touch control electrode lead wires, the touch control electrode lead wires can be arranged in the non-display area between adjacent pixel units in the display area, that is, the touch control electrode lead wires are arranged in the light shielding area of the black matrix of the color filter substrate, so that even though the first metal layer is opaque, it will not result in reducing the aperture ratio of the display device.

Preferably the touch control electrodes receive a touch control scanning signal concurrently, the touch control electrode lead wires are connected with the module configured to detect the touch control signal, and the module configured to detect the touch control signal determines touch control locations according to sensing signals of the touch control electrodes.

Figure 9A:
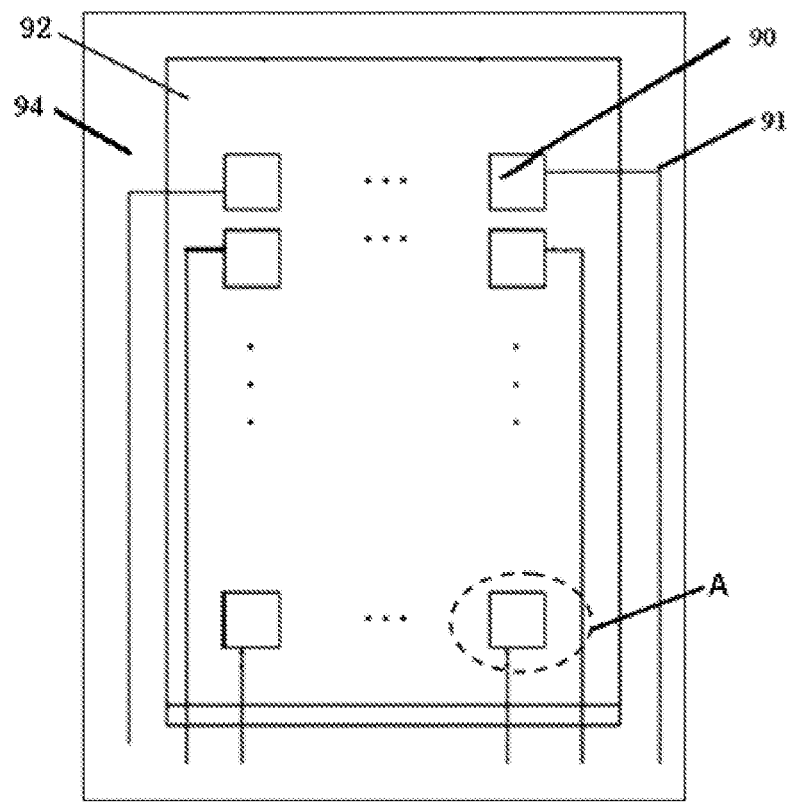
FIG. 9(a) is a schematic structural diagram of touch control electrodes and touch control electrode lead wires in a color filter substrate of a capacitive touch control screen according to an embodiment of the invention.
Figure 9B:
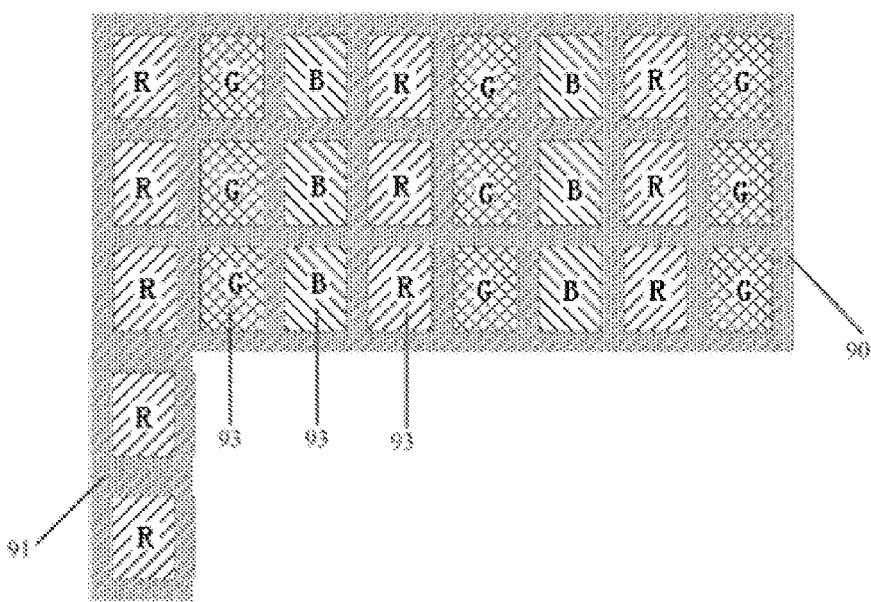
FIG. 9(b) is a local enlarged diagram of the touch control electrode at the area A in FIG. 9(a)

FIG. 9(*a*) is a schematic structural diagram of touch control electrodes and touch control electrode lead wires in a color filter substrate of a capacitive touch control screen according to an embodiment of the invention. As illustrated in FIG. 9(*a*), the color filter substrate of the capacitive touch control screen according to the particular embodiment of the invention includes a black matrix (not illustrated in this figure) and a color filter layer in a black matrix area 92, and a peripheral area 94, wherein the color filter substrate further includes a plurality of touch control electrodes 90 and touch control electrode lead wires 91 connected with a module configured to detect the touch control signal, where the touch control electrodes 90 are located in the area 92 in which the black matrix is located, and each touch control electrode 90 is connected respectively with one touch control electrode lead wire 91. In this embodiment, the touch control electrode lead wires 91 are led out from two sides of the peripheral area 94 onto color filter substrate conductive electrodes (not illustrated in this figure) preset on the color filter substrate side. FIG. 9(*b*) is an enlarged diagram of a touch control electrode 90 at the area A in FIG. 9(*a*). As illustrated in FIG. 9(*b*), the color filter layer 93 includes red color resistors R, green color resistors G and blue color resistors B, and the touch control electrode 90 corresponds to pixel units corresponding to a plurality of color resistors 93. Since the touch control electrode 90 is an opaque conductive layer, the touch control electrode 90 is located only in the area where the black matrix is located, that is, the touch control electrode 90 is structured as a grid hollowed at the locations of the color filter layer corresponding to the red color resistors R, the green color resistors G and the blue color resistors B. Each touch control electrode 90 is connected respectively with one touch control electrode lead wire 91, and the touch control electrode lead wires 91 are also located only in the area where the black matrix is located, that is, the touch control electrode lead wires 91 are also structured as a grid hollowed at the corresponding locations of the color filter layer. The touch control electrodes 90 and the touch control electrode lead wires 91 are arranged overlapping with the black matrix. The widths of the touch control electrodes 90 and the touch control electrode lead wires 91 are configured to be smaller than or equal to the width of the black matrix to thereby avoid influencing the display transmittance due to the arrangement of the opaque touch control electrodes 90 and touch control electrode lead wires 91.

According to a particular embodiment of the invention, the color filter substrate of the capacitive touch control screen further includes a first metal layer arranged on the black matrix, where the first metal layer acts as the touch control electrodes 90. When the display is a liquid crystal display in the Twisted Nematic (TN) mode, the touch control electrodes 90 are configured as a common electrode, and in a particular embodiment of the invention, the common electrode is made of the ITO material which is a transparent conductive layer. In this configuration, the common electrode can be located at the color filter layer instead of being located in the black matrix area 92, and the common electrode can simply be divided into separate zones, each of which is used as one touch control electrode 90. Since a square resistance of the ITO is higher, a metal layer can be added on the ITO to lower the resistance of the common electrode. In a particular embodiment of the invention, a second metal layer is arranged to be electrically connected with the common electrode ITO, and as illustrated in FIG. 9(*b*), the second metal layer faces the black matrix area 92, and the second metal layer is made of a low-resistance material, e.g., molybdenum (Mo), aluminum (Al), an alloy thereof or another metal material.

Figure 10:
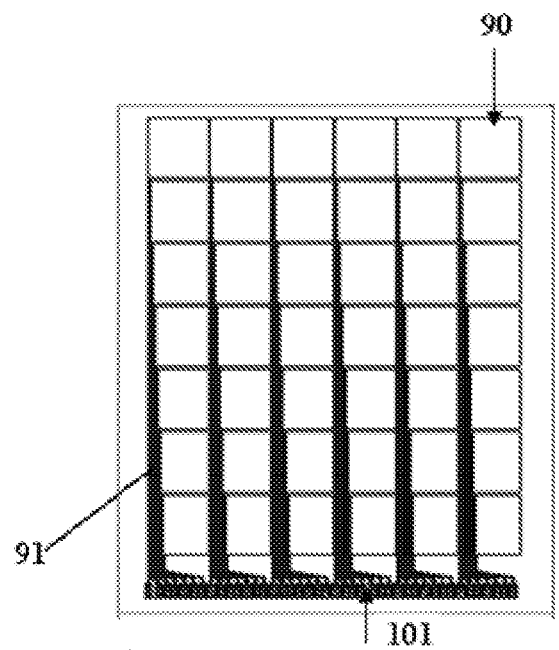
FIG. 10 is a schematic connection diagram of touch control electrode lead wires in a color filter substrate of a capacitive touch control screen according to an embodiment of the invention.

As illustrated in FIG. 10, according to a particular embodiment of the invention, the touch control electrode lead wires 91 of the touch control electrodes 90 in the color filter substrate of the capacitive touch control screen are led out from the black matrix area onto color filter substrate conductive electrodes 101 preset on the color filter substrate side, where the color filter substrate conductive electrodes 101 are configured to receive the touch control signal, and at this time, the touch control electrode lead wires 91 can be the first metal layer.

Figure 11:
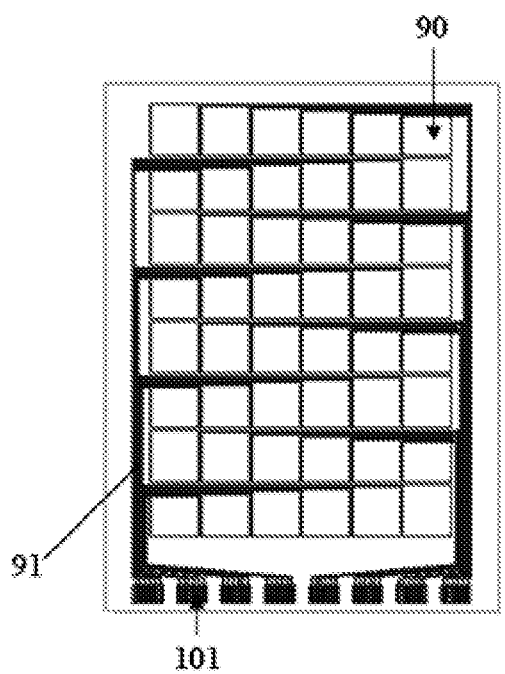
FIG. 11 is another schematic connection diagram of touch control electrode lead wires in a color filter substrate of a capacitive touch control screen according to an embodiment of the invention.

As illustrated in FIG. 11, the touch control electrode lead wires 91 of the touch control electrodes 90 in the color filter substrate of the capacitive touch control screen are led out from two sides of the peripheral area onto the color filter substrate conductive electrodes 101 preset on the color filter substrate side. In this configuration, the touch control electrode lead wires 91 can be the first metal layer. The manner that the touch control electrode lead wires 91 are led out from two sides of the peripheral area onto the color filter substrate conductive electrodes 101 preset on the color filter substrate side can avoid both an overly wide single-side edge of the color filter substrate and the short-circuiting problem due to overly dense wirings on the single side, as compared with the manner that the touch control electrode lead wires 91 are led out from the single side of the peripheral area.

The above embodiment is just one of the embodiments, and the touch control electrode lead wires can alternatively be led out from a single side of the peripheral area onto the color filter substrate conductive electrodes preset on the color filter substrate side; or a part of the touch control electrode lead wires are led out from the black matrix area onto the color filter substrate conductive electrodes preset on the color filter substrate side, and a part of the touch control electrode lead wires are led out from two sides or a single side of the peripheral area onto the color filter substrate conductive electrodes preset on the color filter substrate side.

According to a particular embodiment of the invention, when the touch control electrode lead wires in the color filter substrate of the capacitive touch control screen are the common electrode layer, the touch control electrode lead wires are led out from the black matrix area or from two sides or a single side of the peripheral area onto the color filter substrate conductive electrodes preset on the color filter substrate side, where the color filter substrate conductive electrodes are configured to receive the touch control signal. According to a particular embodiment of the invention, when the touch control electrode lead wires in the color filter substrate of the capacitive touch control screen are configured as the common electrode layer, a part of the touch control electrode lead wires are led out from the black matrix area onto the color filter substrate conductive electrodes preset on the color filter substrate side, and a part of the touch control electrode lead wires are led out from two sides or a single side of the peripheral area onto the color filter substrate conductive electrodes preset on the color filter substrate side, where the color filter substrate conductive electrodes are configured to receive the touch control signal.

According to a particular embodiment of the invention, when the touch control electrode lead wires in the color filter substrate of the capacitive touch control screen are the second metal layer, the touch control electrode lead wires are led out from the black matrix area or from two sides or a single side of the peripheral area onto the color filter substrate conductive electrodes preset on the color filter substrate side, where the color filter substrate conductive electrodes are configured to receive the touch control signal. According to a particular embodiment of the invention, when the touch control electrode lead wires in the color filter substrate of the capacitive touch control screen are the second metal layer, a part of the touch control electrode lead wires are led out from the black matrix area onto the color filter substrate conductive electrodes preset on the color filter substrate side, and a part of the touch control electrode lead wires are led out from two sides or a single side of the peripheral area onto the color filter substrate conductive electrodes preset on the color filter substrate side, where the color filter substrate conductive electrodes are configured to receive the touch control signal.

Particularly the color filter substrate conductive electrodes receive the touch control signal via a channel.

Figure 12:
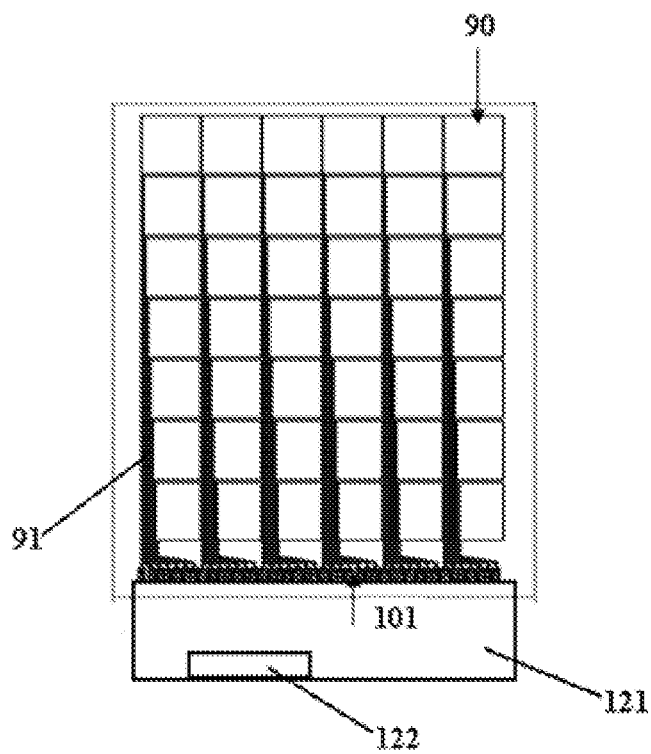
FIG. 12 is a schematic diagram of a channel of a color filter substrate conductive electrode in a color filter substrate of a capacitive touch control screen according to an embodiment of the invention.

As illustrated in FIG. 12, when the channel is located on the color filter substrate side, the channel is implemented as a touch control flexible circuit board 121 laminated together with the color filter substrate conductive electrodes 101, where the touch control flexible circuit board 121 is integrated with a touch control IC 122.

When the channel is located on the array substrate side, the color filter substrate conductive electrodes are connected with array substrate conductive electrodes through conductive metal balls, and the array substrate conductive electrodes are connected with a display flexible circuit board, where the display flexible circuit board is integrated with a first IC for display operations and a second IC for touch control operations; or the color filter substrate conductive electrodes are connected with array substrate conductive electrodes through conductive metal balls, and the array substrate conductive electrodes are connected with a display flexible circuit board, where the display flexible circuit board is integrated with a third IC for both display and touch control operations.

Preferably the touch control electrodes receive a touch control scanning signal concurrently, and the touch control electrode lead wires and the color filter substrate conductive electrodes are connected with the module configured to detect the touch control signal through channels to detect signals of the respective touch control electrodes respectively.

A particular embodiment of the invention further provides a touch control display device, which includes the array substrate described above and/or the color filter substrate described above. A method for driving the touch control display device includes: all the touch control electrodes receiving a touch control scanning signal and also receiving feedback signals through touch the control electrode lead wires connected with the respective touch control electrodes in a touch control phase of the display device, where the touch control electrode lead wires are connected with a module configured to detect a touch control signal to detect signals of the respective touch control electrodes.

Figure 13:
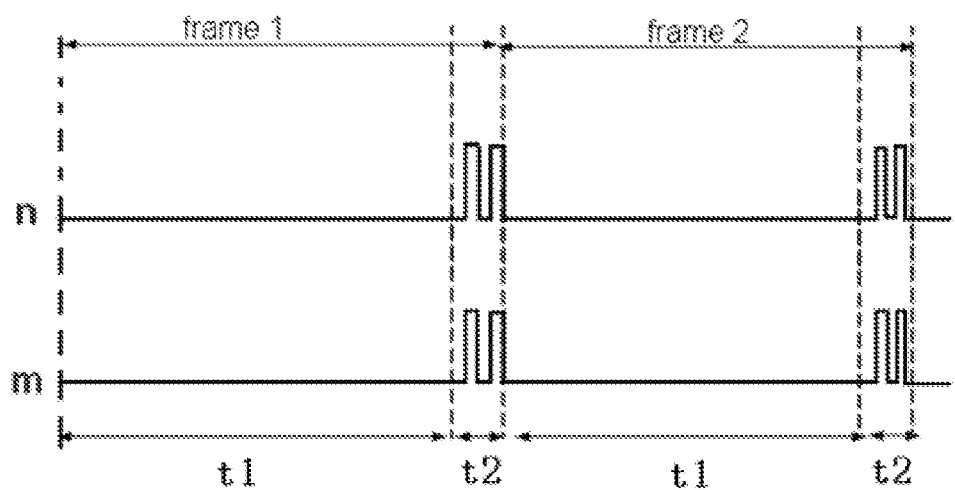
FIG. 13 is a schematic diagram of a square wave signal inputted to a touch control display device in a touch control phase according to an embodiment of the invention.
Figure 14:
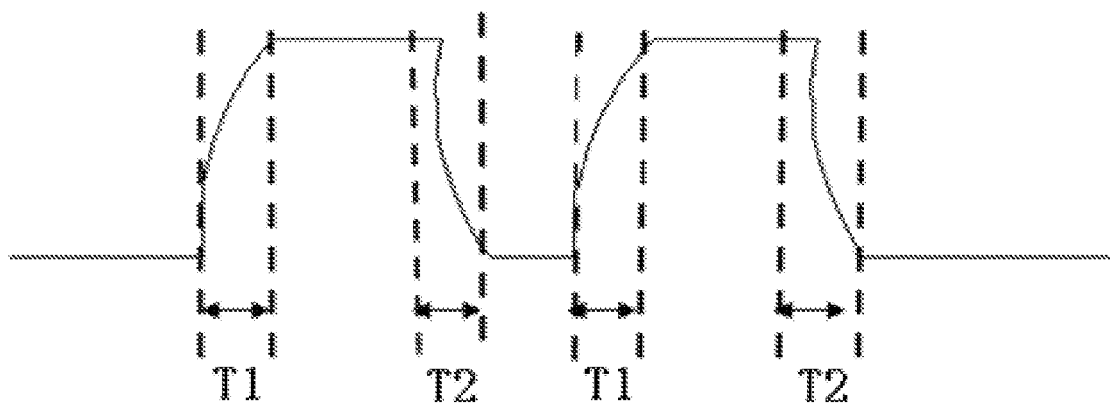
FIG. 14 is an enlarged schematic diagram of a square wave signal inputted to a touch control display device in a touch control phase according to an embodiment of the invention.

In the traditional display scheme, the display scan frequency is 60 Hz and the period of time of one frame is 16.67 ms. There is a scan-free interval of time after one frame is scanned and data signals are inputted, and a time division drive function of an integrated touch screen can be achieved in this interval of time. In a particular embodiment of the invention, display and touch control operations can be performed separately as per the timing of the time division drive, and as illustrated in FIG. 13, a period of time per frame is divided into a display period of time t1 and a touch period of time t2. All of touch control units drive and receive a touch control signal concurrently in the touch period of time t2, a drive circuit inputs a multi-cycle square wave signal to a touch control electrode n and a touch control electrode m concurrently in the touch period of time t2, and the enlarged diagram of the signal is illustrated in FIG. 14 in which each touch control cycle includes a charging period of time T1 and a discharging period of time T2. During charging, touch control electrode lead wires receive a drive signal and then input the drive signal to the touch control electrodes to charge the touch control electrodes, that is, all the touch control electrodes receive the touch control drive signal concurrently; and during discharging, sensing signals are outputted through the touch control electrode lead wires connected with the touch control electrodes, and whether there is a touch can be judged by calculating the amount of discharge, that is, the touch control electrodes output the sensing signals concurrently, where the touch control electrode lead wires connected with the respective touch control electrodes are connected with a module configured to detect a touch control signal, and the module configured to detect the touch control signal determines touch control locations according to the sensing signals of the touch control electrodes. Since all the touch control elements have lead wires, changes in self-capacitance of all the touch control electrodes can be detected concurrently during only one scan in the touch control period of time to thereby shorten effectively the period of time for the touch control operations and also achieve the self-capacitive multi-point touch. The touch control electrodes are connected with a specific voltage, e.g., a common electrode voltage, in the display period of time, to thereby avoid influencing the display effect. Larger screens in size can be supported in the technical solutions according to the particular embodiments of the invention, as compared with the conventional in-cell touch control scheme.

It is to be appreciated that there the present invention has many implementations and embodiments. An embodiment of the invention provides an array substrate of a capacitive touch control screen, which includes: a peripheral area and a display area; a plurality of pixel units with pixel electrodes arranged in the display area; a plurality of touch control electrodes; and touch control electrode lead wires connected with a module configured to detect a touch control signal, wherein each of the touch control electrodes is connected respectively with one of the touch control electrode lead wires.

An embodiment of the invention further provides a color filter substrate of a capacitive touch control screen, which includes a black matrix, a color filter layer and a peripheral area, wherein the color filter substrate further comprises a plurality of touch control electrodes and touch control electrode lead wires connected with a module configured to detect a touch control signal, wherein the touch control electrodes are located in an area of the black matrix, and each of the touch control electrodes is connected respectively with one of the touch control electrode lead wires.

An embodiment of the invention further provides a touch control display device which includes the array substrate of the capacitive touch control screen and/or the color filter substrate of the capacitive touch control screen described above.

An embodiment of the invention further provides a method for driving the touch control display device described above, which includes:

the touch control electrodes receiving a touch control drive signal and the touch control electrodes outputting sensing signals in a touch control phase of the display device, wherein the touch control electrode lead wires connected with the respective touch control electrodes are connected with the module configured to detect the touch control signal, and the module configured to detect the touch control signal determines touch control locations according to the sensing signals of the touch control electrodes.

Based upon the array substrate and color filter substrate of the capacitive touch control screen, the touch control display device and the method for driving the touch control display device according to the invention, the array substrate includes a plurality of touch control electrodes and touch control electrode lead wires connected with a module configured to detect a touch control signal, where each of the touch control electrodes is connected respectively with one of the touch control electrode lead wires; the color filter substrate includes a plurality of touch control electrodes and touch control electrode lead wires connected with a module configured to detect a touch control signal, where the touch control electrodes are located in the area of the black matrix, and each of the touch control electrodes is connected respectively with one of the touch control electrode lead wires; and the touch control display device includes the array substrate of the capacitive touch control screen and/or the color filter substrate of the capacitive touch control screen described above. Instead of the manner of scanning in rows and columns, a manner that there is a separate lead wire for each touch control unit composed of each touch control electrode and one touch control electrode lead wire connected therewith is used, so this kind of self-capacitive design does not have the problem of ghost points, and can achieve the multi-point touch control and also have high sensitivity in self-capacitive applications.

It is to be appreciated that there are other embodiments as well. Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

What is claimed is:

1. An array substrate of a capacitive touch control screen, comprising: a peripheral area and a display area; a plurality of pixel units with pixel electrodes positioned in the display area; a plurality of touch control electrodes; and touch control electrode lead wires connected with a module configured to detect a touch control signal, wherein each of the touch control electrodes is connected respectively with one of the touch control electrode lead wires, wherein the touch control electrode lead wires comprise the first metal layer or the common electrode, and a part of the touch control electrode lead wires are led out from two sides or a single side of the peripheral area to the module configured to detect the touch control signal; and a part of the touch control electrode lead wires are led out from the display area to the module configured to detect the touch control signal.

2. The array substrate of the capacitive touch control screen according to claim 1, further comprising a common electrode positioned above or below the pixel electrodes, wherein the common electrode acts as the touch control electrodes.

3. The array substrate of the capacitive touch control screen according to claim 2, further comprising a first metal layer electrically connected with the common electrode and positioned in non-display areas between the pixel units.

4. The array substrate of the capacitive touch control screen according to claim 1, wherein the touch control electrode lead wires comprise a gate metal layer or a source metal layer or a drain metal layer, the plurality of touch control electrodes are connected to the touch control electrode lead wires through via holes in an edge area of the display area, and the touch control electrode lead wires are led out from two sides or a single side of the peripheral area to the module configured to detect the touch control signal.

5. The array substrate of the capacitive touch control screen according to claim 1, wherein the touch control electrodes receive a touch control scanning signal concurrently, and the touch control electrode lead wires are connected with the module configured to detect the touch control signal to detect signals of the respective touch control electrodes respectively.

6. A color filter substrate of a capacitive touch control screen, comprising a black matrix, a color filter layer and a peripheral area, wherein the color filter substrate further comprises a plurality of touch control electrodes and touch control electrode lead wires connected with a module configured to detect a touch control signal, wherein the touch control electrodes are located in an area of the black matrix, and each of the touch control electrodes is connected respectively with one of the touch control electrode lead wires, wherein a part of the touch control electrode lead wires are led out from the area of the black matrix onto the color filter substrate conductive electrodes preset on the color filter substrate side, and a part of the touch control electrode lead wires are led out from two sides or a single side of the peripheral area onto the color filter substrate conductive electrodes preset on the color filter substrate side, wherein the color filter substrate conductive electrodes are configured to receive the touch control signal.

7. The color filter substrate of the capacitive touch control screen according to claim 6, further comprising a first metal layer positioned on the black matrix, wherein the first metal layer acts as the touch control electrodes.

8. The color filter substrate of the capacitive touch control screen according to claim 6, wherein the touch control electrodes comprise a common electrode.

9. The color filter substrate of the capacitive touch control screen according to claim 8, further comprising a second metal layer electrically connected with the common electrode ITO, wherein the second metal layer faces the area of the black matrix.

10. The color filter substrate of the capacitive touch control screen according to claim 6, wherein the color filter substrate conductive electrodes receive the touch control signal via a channel; and
the channel comprises:
a touch control flexible circuit board laminated together with the conductive electrodes, wherein the touch control flexible circuit board is integrated with a touch control IC; or
conductive metal balls to connect the color filter substrate conductive electrodes with array substrate conductive electrodes connected with a display flexible circuit board, wherein the display flexible circuit board is integrated with a first IC for display operations and a second IC for touch control operations; or
conductive metal balls to connect the color filter substrate conductive electrodes with array substrate conductive electrodes connected with a display flexible circuit board, wherein the display flexible circuit board is integrated with a third IC for both display and touch control operations.

11. The color filter substrate of the capacitive touch control screen according to claim 6, wherein the touch control electrodes receive a touch control scanning signal concurrently, and the touch control electrode lead wires and the color filter substrate conductive electrodes are connected with the module configured to detect the touch control signal through channels to detect signals of the respective touch control electrodes respectively.

12. A touch control display device, comprising an array substrate and/or a color filter substrate, wherein:
the array substrate comprises: a peripheral area and a display area; a plurality of pixel units with pixel electrodes positioned in the display area; a plurality of touch control electrodes; and touch control electrode lead wires connected with a module configured to detect a touch control signal, wherein each of the touch control electrodes is connected respectively with one of the touch control electrode lead wires, wherein the touch control electrode lead wires comprise the first metal layer or the common electrode, and a part of the touch control electrode lead wires are led out from two sides or a single side of the peripheral area to the module configured to detect the touch control signal; and a part of the touch control electrode lead wires are led out from the display area to the module configured to detect the touch control signal; and
the color filter substrate comprises: a black matrix, a color filter layer and a peripheral area, wherein the color filter substrate further comprises a plurality of touch control electrodes and touch control electrode lead wires connected with a module configured to detect a touch control signal, wherein the touch control electrodes are located in an area of the black matrix, and each of the touch control electrodes is connected respectively with one of the touch control electrode lead wires.

13. A method for driving the touch control display device according to claim 12, comprising:
the touch control electrodes receiving a touch control drive signal and the touch control electrodes outputting sensing signals in a touch control phase of the display device, wherein the touch control electrode lead wires connected with the respective touch control electrodes are connected with the module configured to detect the touch control signal, and the module configured to detect the touch control signal determines touch control locations according to the sensing signals of the touch control electrodes.

* * * * *